(12) United States Patent
Tomasson

(10) Patent No.: US 7,513,556 B2
(45) Date of Patent: Apr. 7, 2009

(54) VEHICLE ARCHITECTURE

(75) Inventor: Kris Tomasson, Corona del Ma, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 422 days.

(21) Appl. No.: 11/031,894

(22) Filed: Jan. 7, 2005

(65) Prior Publication Data

US 2006/0152025 A1 Jul. 13, 2006

(51) Int. Cl.
*B60N 2/00* (2006.01)
(52) U.S. Cl. .................................................. 296/64
(58) Field of Classification Search ............... 296/64; D12/195
See application file for complete search history.

(56) References Cited

U.S. PATENT DOCUMENTS

| | | | | | |
|---|---|---|---|---|---|
| 3,814,478 | A | * | 6/1974 | Clark | 297/445.1 |
| 4,255,915 | A | * | 3/1981 | Muriotto | 52/601 |
| 4,534,591 | A | * | 8/1985 | Parker | 297/270.5 |
| D303,647 | S | * | 9/1989 | Lim | D12/195 |
| D361,972 | S | * | 9/1995 | Ney et al. | D12/195 |
| 6,129,404 | A | * | 10/2000 | Mattarella et al. | 296/65.09 |
| 6,485,102 | B1 | * | 11/2002 | Moffa et al. | 297/253 |
| 6,739,673 | B2 | * | 5/2004 | Gupta et al. | 297/452.65 |
| 2002/0153740 | A1 | * | 10/2002 | Miyahara et al. | 296/64 |
| 2003/0063756 | A1 | * | 4/2003 | Geerlings et al. | 381/86 |
| 2004/0140705 | A1 | * | 7/2004 | McMillen et al. | 297/378.1 |
| 2004/0164582 | A1 | * | 8/2004 | Swift | 296/66 |

FOREIGN PATENT DOCUMENTS

WO   WO 92/14630   *   9/1992

OTHER PUBLICATIONS

Land Rover US—Overview, EnlargeImagePopup, Photos (www.landroverusa.com (pp. 1-24).
Advertisement: AUTOWEB RE: 2005 GMC Safari (pp. 1-8).
Advertisement: AUTOWEB RE: 2005 Chrysler Town & Country (pp. 1-8).
Advertisement: AUTOWEB RE: 2005 Honda Odyssey EX 5-Spd AT (pp. 1-6).
Advertisement: AUTOBWEB RE: 2005 Toyota Sienna CE with 7 Passenger Seating (pp. 1-6).

* cited by examiner

*Primary Examiner*—Lori L Lyjak
(74) *Attorney, Agent, or Firm*—Frank A. MacKenzie; Brooks Kushman P.C.

(57) ABSTRACT

One aspect of the present invention relates to an interior vehicle architecture including a first zone having a first design focus; a second zone having a second design focus; and a third zone having a third design focus. Each of the first, second, and third design focuses are distinctive. The vehicle interior can be a minivan interior.

16 Claims, 10 Drawing Sheets

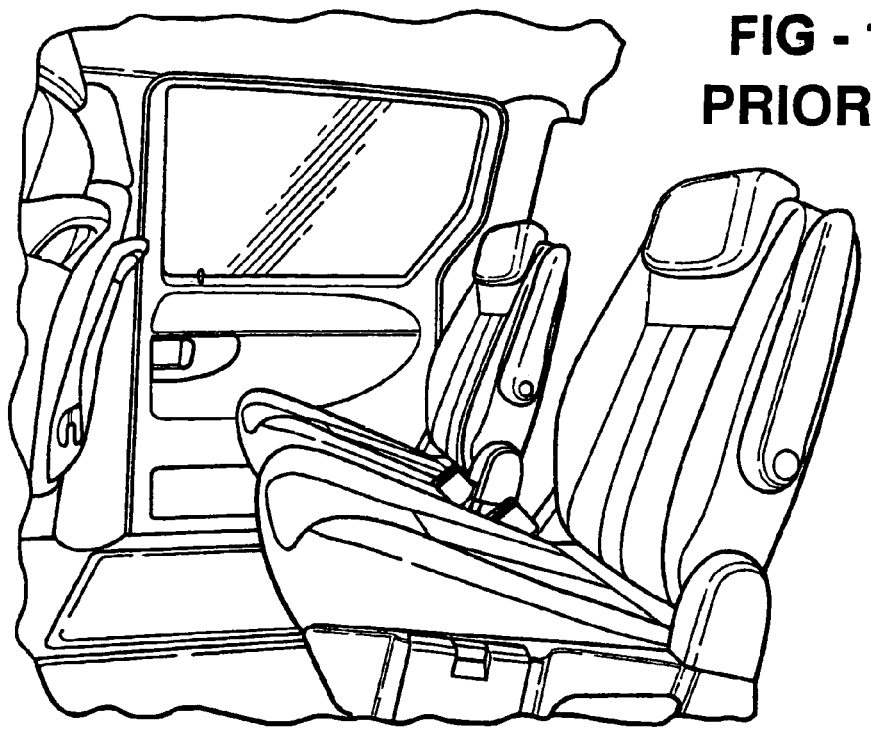
FIG - 1-A PRIOR ART
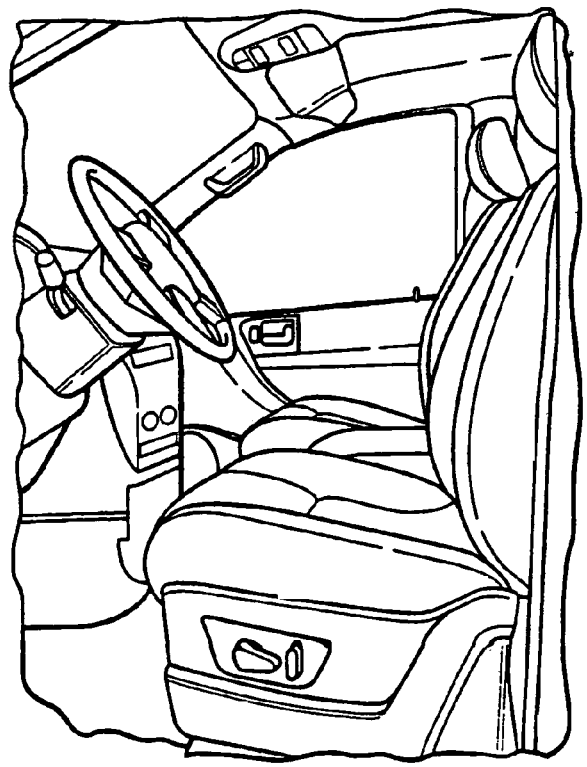
FIG - 1-B PRIOR ART

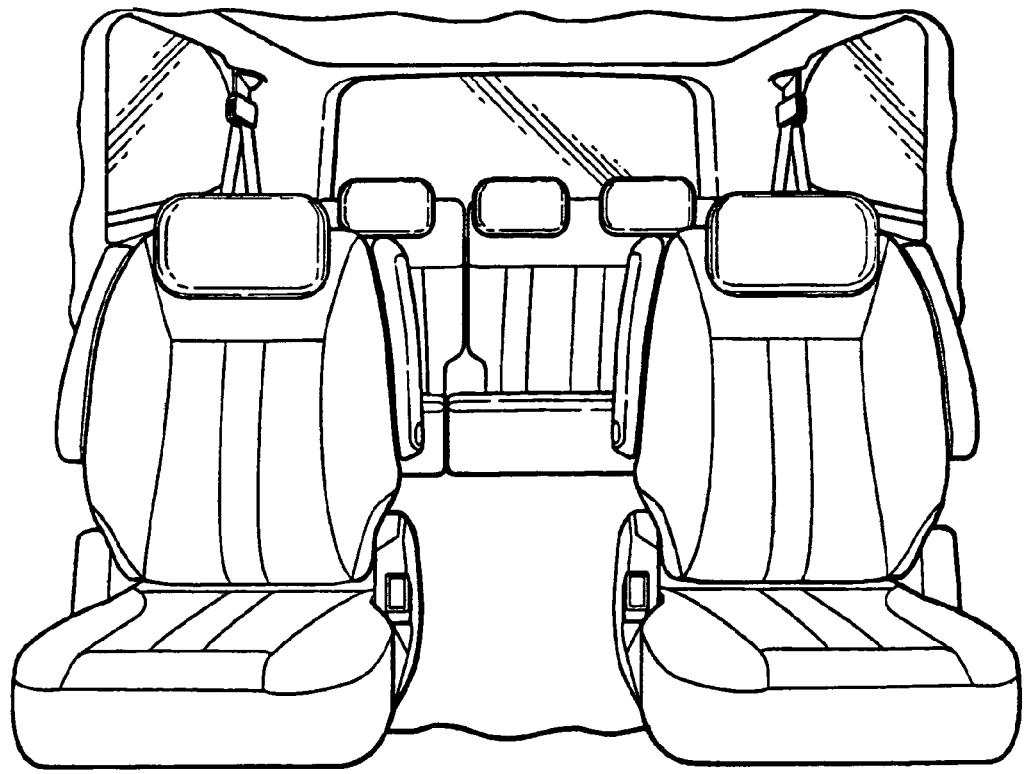
FIG - 1-C
PRIOR ART
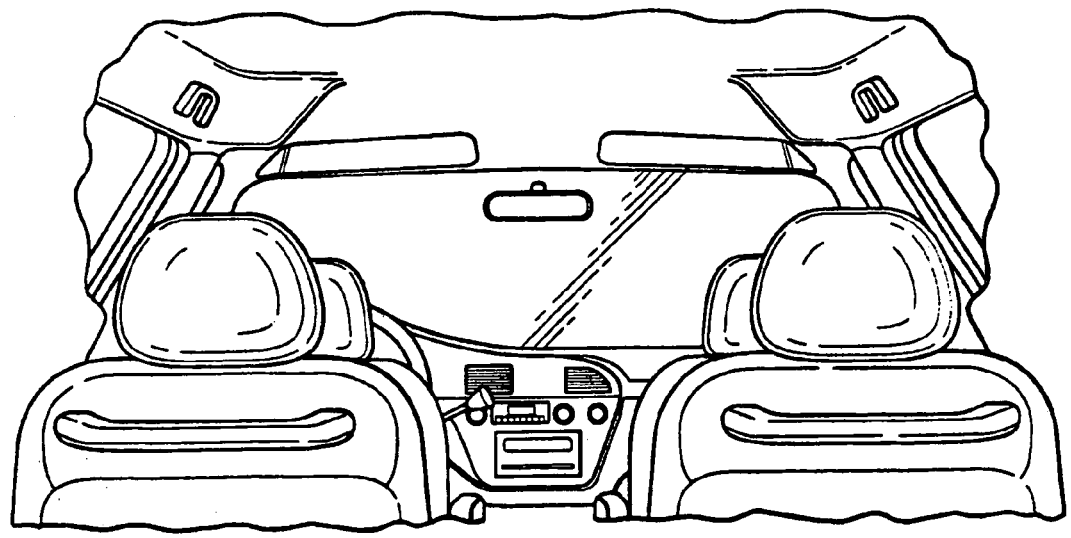
FIG - 2-B
PRIOR ART

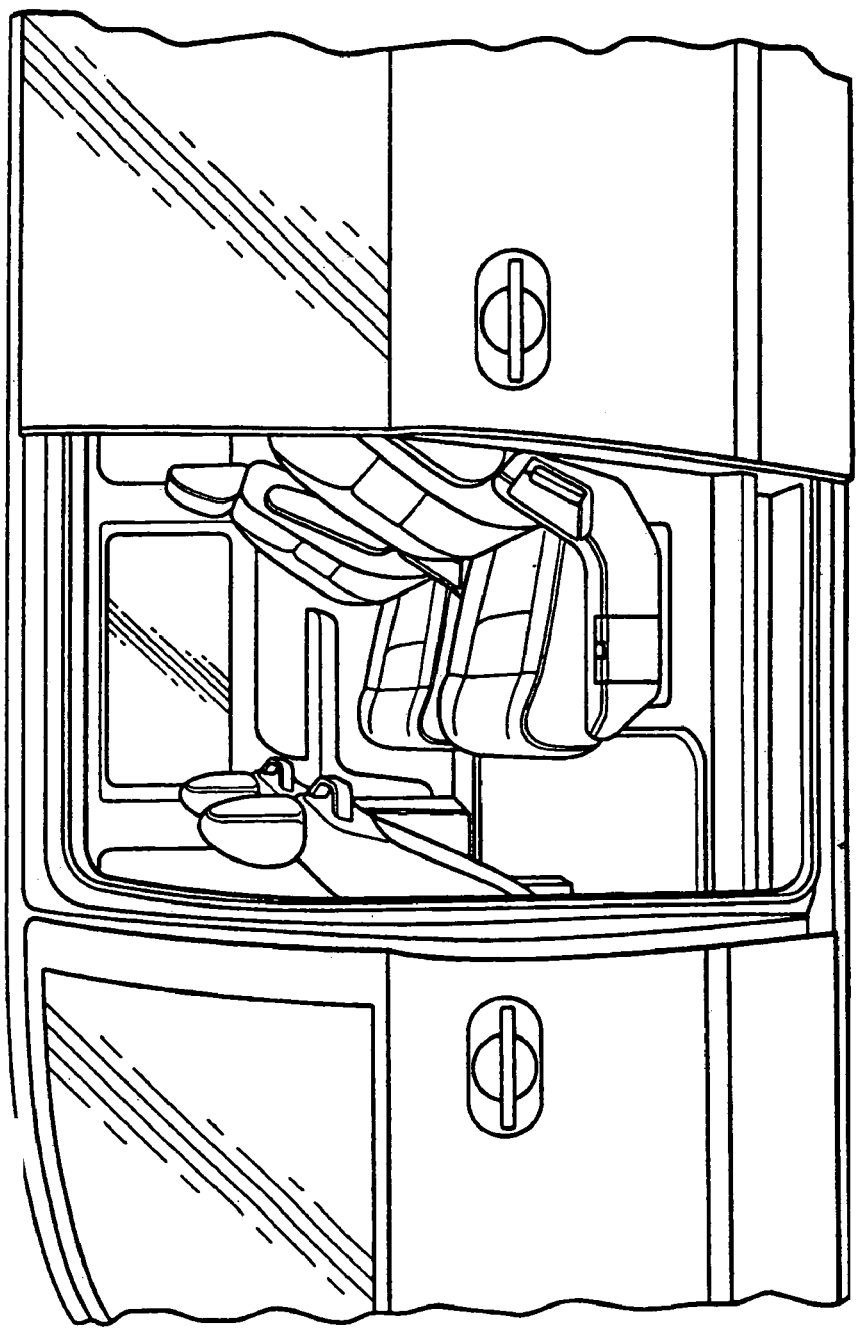
FIG-2-A
PRIOR ART

FIG - 3-A
PRIOR ART
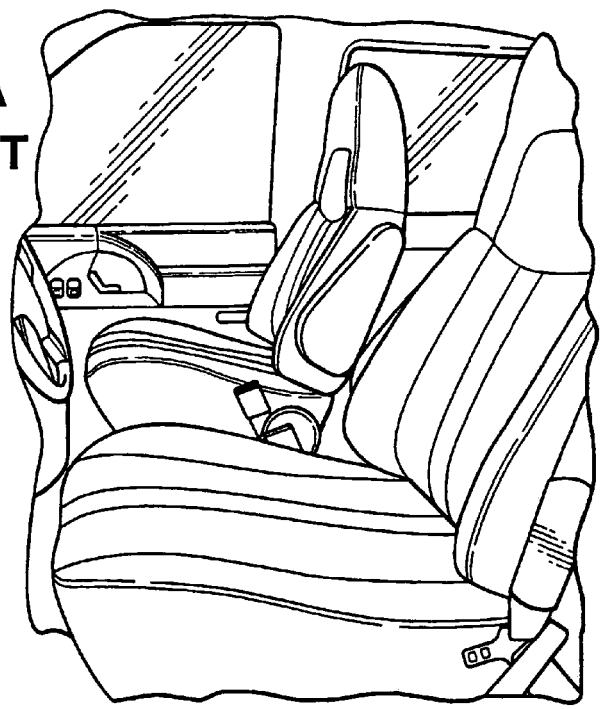
FIG - 3-B
PRIOR ART
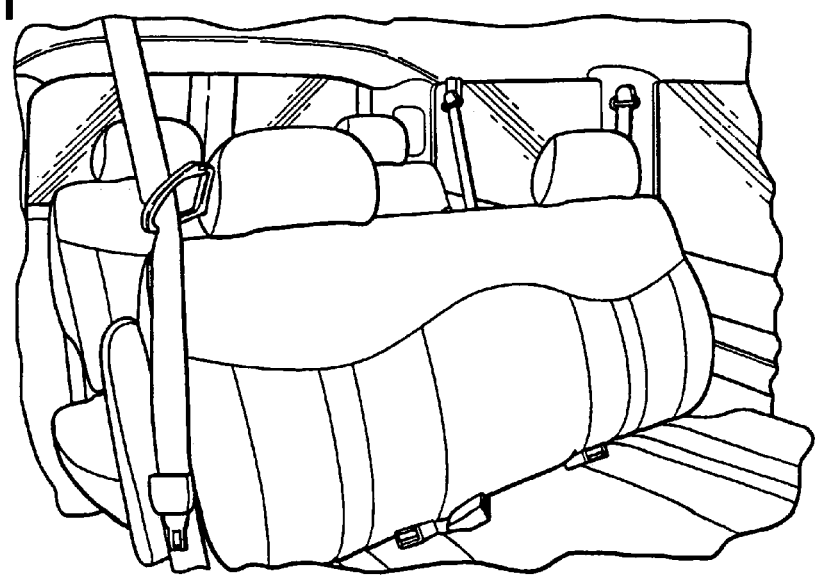

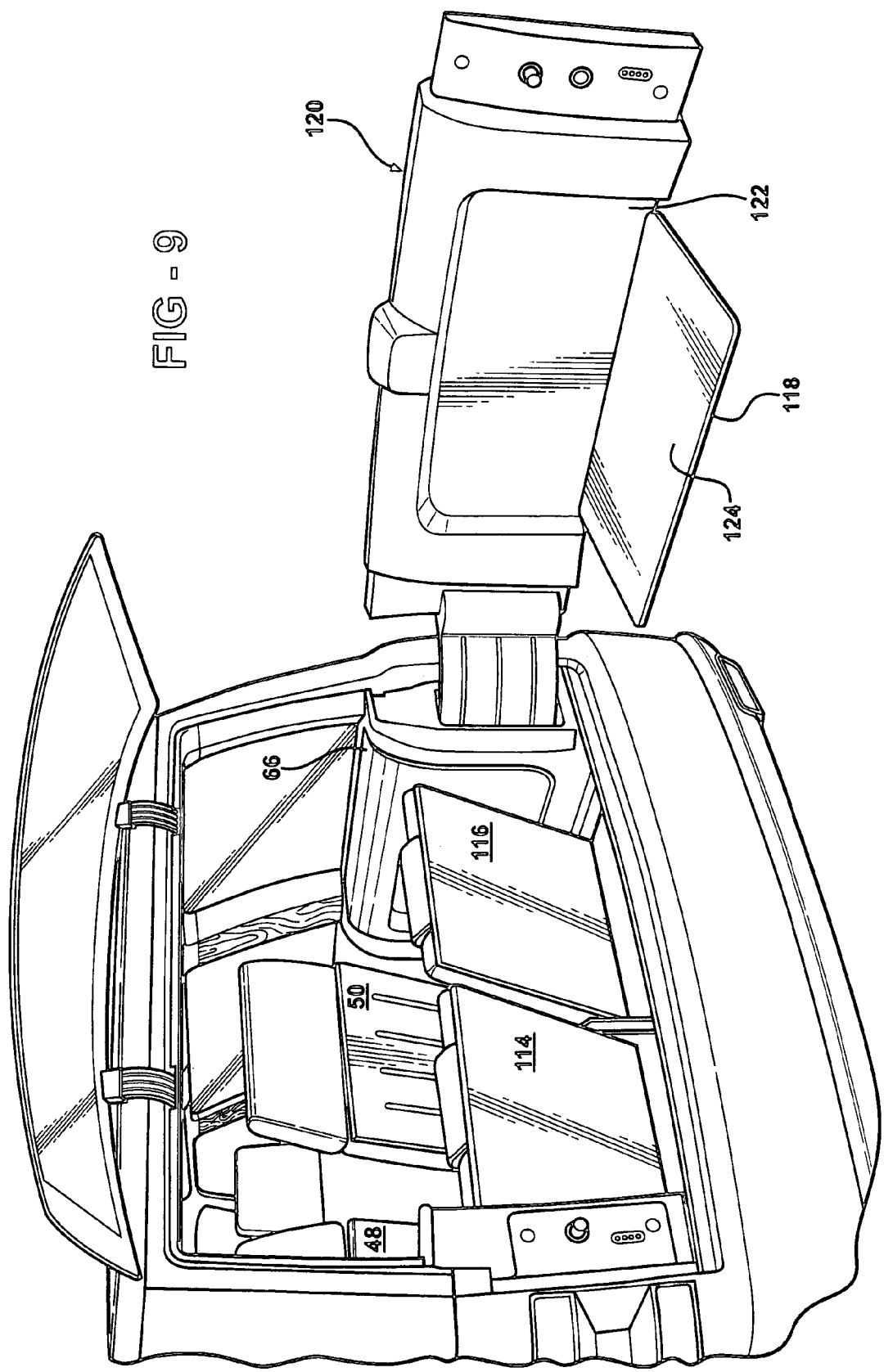

VEHICLE ARCHITECTURE

BACKGROUND OF THE INVENTION

1. Field of the Invention

One aspect of the present invention generally relates to a vehicle design architecture, and more specifically, to a vehicle interior design architecture.

2. Background Art

In today's motor vehicle market, the consumer has a multitude of vehicle makes and models to choose from when making a decision to acquire a vehicle. This variety is especially apparent for family passenger vans, otherwise referred to as minivans. Over the last several years, intense competition has divided the market share for this vehicle category between an increasing number of vehicle manufacturers. In order to increase brand recognition as a way to increase revenues and market share, vehicle manufacturers are concentrating more and more resources on designing vehicle architectures to generate memorable and distinguishable vehicle models.

Vehicle architecture design can include the design of the interior and exterior of the vehicle. With respect to minivans, vehicle manufacturers have proposed several vehicle interior design architectures. Commonly, minivan interiors include three rows of seating, i.e., a first row for a driver and a shotgun passenger, a second row, located behind the first row, for passengers, and a third row, located behind the first and second rows, for passengers. According to current proposals, each row of the minivan interior shares a unified design approach.

For example, the 2005 Chrysler Town & Country minivan has a common design approach throughout the interior of the vehicle. FIGS. 1a, 1b, and 1c depict interior views of the 2005 Chrysler Town & Country showing the unified design approach. As can be seen by these figures, each seat back includes a number of design lines which are common to each seat back in the vehicle. More specifically, each seat back contains a pair of vertical parallel lines connected to a perpendicular horizontal line to form a "T" design. Moreover, the fabric used to cover the seat back and seat cushion is the same throughout all three rows of seating. Further, a common color, or slight variation thereof, are used for the seating fabric, the instrument panel, steering wheel, the interior door surfaces, the ceiling, and the vehicle pillars. In sum, the interior of the 2005 Chrysler Town & Country minivan achieves a uniform design approach.

The 2005 Honda Odyssey minivan also includes an interior having a unified design approach. FIGS. 2a and 2b depict interior views of the 2005 Honda Odyssey. The rear surface of each seat back has a handle having the same design and structure. The shape of the head rests is also uniformed throughout, as are the colors selected throughout the interior.

As another example of a minivan having a unified design approach, FIGS. 3a and 3b depict interior views of the 2005 GMC Safari minivan. With reference to these figures, the seat backs have a wavy "T" design wherein two parallel vertical design lines are capped with a generally curved, vertical line. As with the 2005 Chrysler Town & Country and the 2005 Honda Odyssey, the 2005 GMC Safari includes an interior having three rows of seating covered with the same fabric and having the same color. Additionally, the head rests attached to each seat back share a common look, feel, and color throughout the entire vehicle interior. Overall, the design approach retains uniformity throughout all three rows of the vehicle.

Disadvantageously, the uniformed design approach does not tailor design features based on the individuals that typically occupy the different rows of the minivan. For example, in the case of a family minivan, the first row is usually occupied by the parents, while the second and third rows are for children and their friends. In another scenario, the parents may be sitting in the front row while the second row is used by another couple who are friends of the parents. In either situation, the prior art design approaches are not focused on the individuals occupying the different rows.

Although the uniformed design approach may appeal to some consumers, there exists a need in the minivan market for an interior that focuses design features within each row of the passenger compartment. In light of the foregoing, what is needed is a vehicle interior architecture having first, second, and third zones, each having a distinctive design focus. What is also needed is a method of designing a vehicle architecture having first, second, and third zone, each having a distinctive design focus.

SUMMARY OF THE INVENTION

One aspect of the present invention is a vehicle interior design architecture having first, second, and third zones, each zone having a distinctive design focus. Another aspect of the present invention is a method for designing a vehicle having a vehicle interior with first, second, and third zone, each having a distinctive design focus. This approach provides a truly unique interior vehicle architecture wherein the design features are focused based on the vehicle zone. Moreover, the design focus can be tailored based on the individuals occupying each zone.

According to a first embodiment of the present invention, a vehicle architecture is disclosed. The vehicle architecture includes a vehicle interior having a first zone and a second zone. The first zone has a first design focus and the second zone has a second design focus. The first design focus is different than the second design focus. Further, the vehicle interior can include a third zone having a third design focus. Each of the first, second, and third design focuses can be different. Each zone can include a number of design features. The vehicle can be a minivan or other motor vehicle. One of the number of design features of each of the first and second zones can be a common design feature, such as laminated wood or stainless steel. The first zone can include a driver and front seat passenger area. The second zone can include a first passenger row area. The third zone can include a second passenger row area. The first design focus can be a cockpit of luxury. The second design focus can be a passenger compartment of comfort. The third design focus can be a cargo area for utility purposes.

According to a second embodiment, a method of designing a vehicle architecture is disclosed. The method includes designing a vehicle interior having a first, second, and third zone and focusing one or more distinctive design features within each of the first, second, and third zones. A distinctive design feature of the first zone can be a laminated wood material. A distinctive design feature of the second zone can be a ratan material. A distinctive design feature of the third zone can be a metal or metal alloy material, such as stainless steel.

According to a third embodiment, an interior vehicle architecture is disclosed. The architecture includes a first zone having a first design focus, a second zone having a second design focus, and a third zone having a third design focus. Each of the first, second, and third design focuses are distinctive. The first zone includes a driver and front row passenger area. The second zone includes a first row passenger area. The third zone includes a second passenger row area. The interior can be a minivan interior or other motor vehicle.

The above and other objects, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompany drawings which:

FIG. 1a is a side perspective view of the second row of seating in a 2005 Chrysler Town & Country minivan;

FIG. 1b is a side perspective view of the first row of seating in a 2005 Chrysler Town & Country minivan;

FIG. 1c is a front perspective view of the interior of a 2005 Chrysler Town & Country minivan;

FIG. 2a is a side perspective view of the second row of seating in a 2005 Honda Odyssey;

FIG. 2b is a rear perspective view of the interior of the 2005 Honda Odyssey minivan;

FIG. 3a is a side perspective view of the first row of seating in the 2005 GMC Safari;

FIG. 3b is a front perspective view of the second and third rows of seating in the 2005 GMC Safari;

FIG. 9 is a second side perspective view of a third zone of the 2005 Ford Fairlane according to one embodiment of the present invention.

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

Except where otherwise expressly indicated, all numerical quantities in this description indicating architectural dimensions are to be understood as modified by the word "about" in describing the broadest scope of the invention. Practice within the numerical limits stated is generally preferred. Also, unless expressly stated to the contrary, the first definition of an acronym or other abbreviation applies to all subsequent uses herein of the same abbreviation and applies mutatis mutandis to normal grammatical variations of the initially defined abbreviation; and, unless expressly stated to the contrary measurement of a dimension is determined by the same technique as previously or later referenced for the same property.

Figure 4:
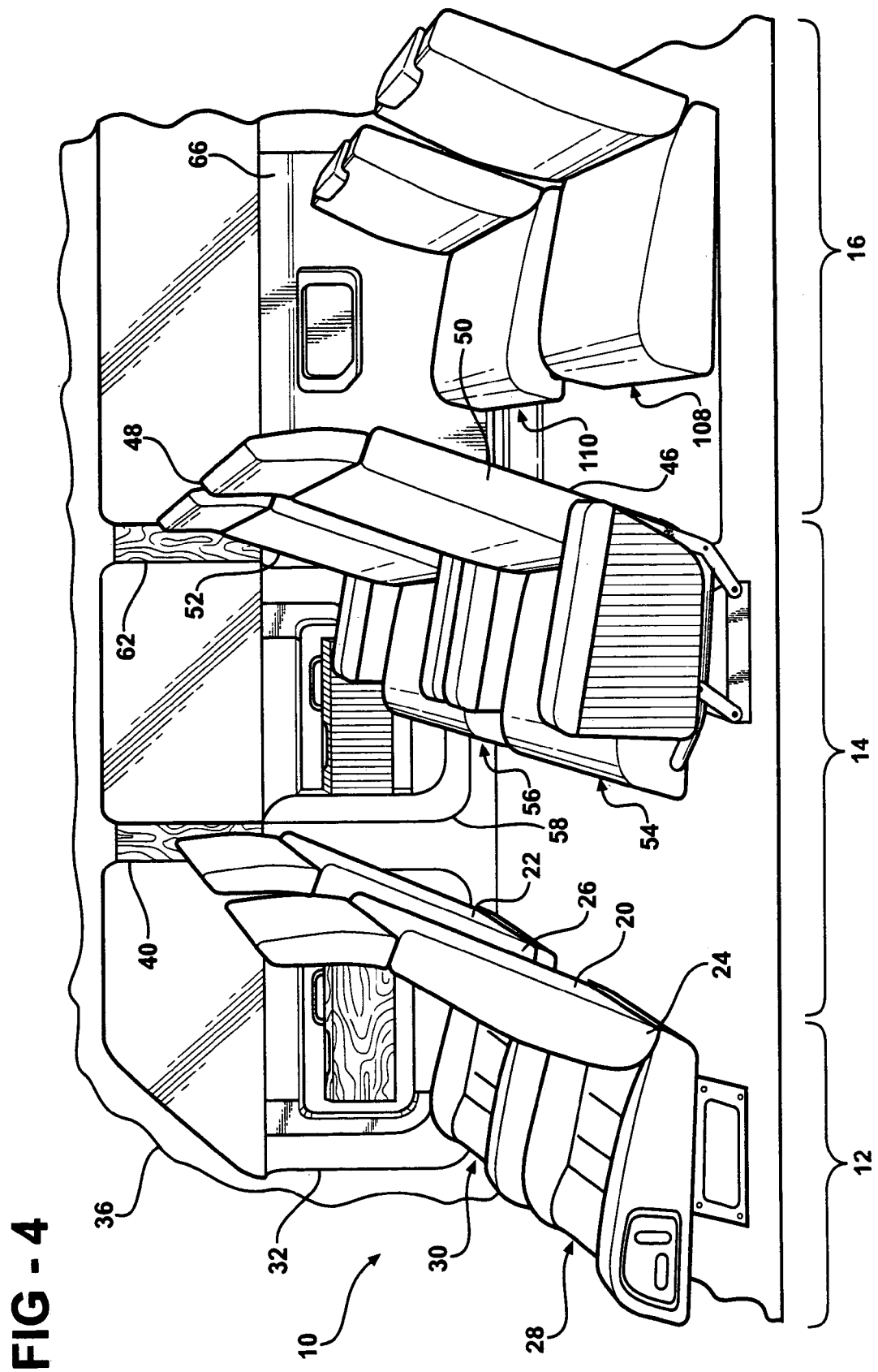
FIG. 4 is a side perspective view of the interior of a 2005 Ford Fairlane according to one embodiment of the present invention.
Figure 5:
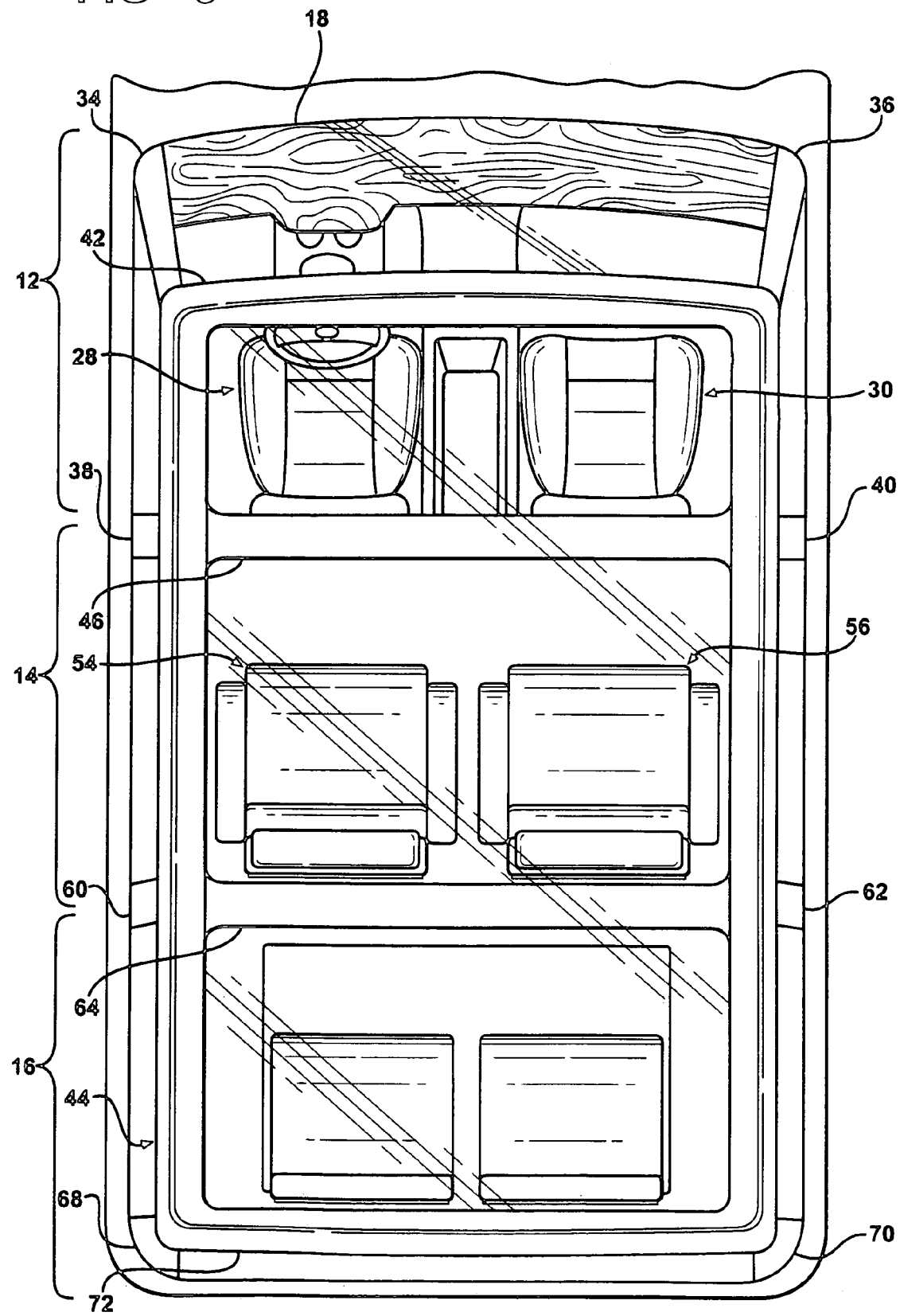
FIG. 5 is a top view of the 2005 Ford Fairlane according to one embodiment of the present invention.

With reference to FIGS. 4 and 5, a side view and top view of vehicle interior 10 of the 2005 Ford Fairlane minivan is shown according one embodiment of the present invention. Interior 10 is divided into three distinctive design zones, first zone 12, second zone 14 and third zone 16.

First zone 12, which can be referred to as the cockpit, is generally bounded by windshield 18 in the front, by rear surfaces 20 and 22 of seat backs 24 and 26 of driver seat 28 and front passenger seat 30 in the rear, by the interior surface of the driver side door on the left, and by interior surface 32 of the front passenger side door on the right. First zone 12 can be further bounded by left and right "A" pillars 34 and 36 and left and right "B" pillars 38 and 40. It should be understood that left vehicle side refers to the driver's side of the vehicle and right vehicle side refers to the front seat passenger side of the vehicle. Furthermore, front portion 42 of roof halo 44 and cross member 46 can further define the boundaries of first zone 12. Cross member 46 extends between "B" pillars 38 and 40 within the plane of halo roof 44. It should be understood that first zone 12 may include all, none, or portions of "A" pillars 34 and 36, "B" pillars 38 and 40, front portion 42, and cross member 46.

In certain embodiments, first zone 12 functions to accommodate a driver and a front row passenger, otherwise referred to as a shotgun passenger. For example, if the minivan is being utilized as a family vehicle, first zone 12 may be occupied by one or two parents.

Second zone 14, which can be referred to as the first passenger zone, is generally bounded by rear surfaces 20 and 22 in the front, by rear surfaces 46 and 48 of seat backs 50 and 52 of first passenger row seats 54 and 56 in the rear, by the interior surface of the first passenger row left door on the left, and by interior surface 58 of the first passenger row right door on the right. Second zone 14 can be further bounded by left and right "B" pillars 38 and 40 and left and right "C" pillars 60 and 62. Furthermore, cross members 46 and 64 can further define the boundaries of second zone 14. Cross member 64 extends between "C" pillars 60 and 62 within the plane of halo roof 44. It should be understood that second zone 14 may include all, none, or portions of "B" pillars 34 and 36, "C" pillars 60 and 62, and cross members 46 and 64.

In certain embodiments, second zone 14 accommodates one or two vehicle passengers. For example, if the minivan is being utilized as a family vehicle, second zone 14 may be occupied by one or two children of the parent(s) seated in first zone 12. Alternatively, second zone 14 can be utilized as a cargo area.

Third zone 16, which can be referred to as the second passenger zone or cargo zone, is generally bounded by rear surfaces 46 and 48 in the front, by the interior surface of the tailgate in the rear, by the interior surface of the second passenger row left side panel on the left, and by interior surface 66 of the second passenger row right side panel on the right. Third zone 16 can be further bounded by left and right "C" pillars 60 and 62 and left and right "D" pillars 68 and 70. Furthermore, rear portion 72 of roof halo 44 and cross member 64 can further define the boundaries of third zone 16. It should be understood that third zone 16 may include all, none, or portions of "C" pillars 60 and 62, "D" pillars 68 and 70, rear portion 72, and cross member 64.

In certain embodiments, third zone 16 accommodates one or two vehicle passengers. Alternatively, third zone 16 can be utilized as a cargo area.

Having thus described the spacial boundaries of first, second, and third zones 12, 14, and 16, reference is now made to the distinctive design focuses and features of each zone.

Figure 6:
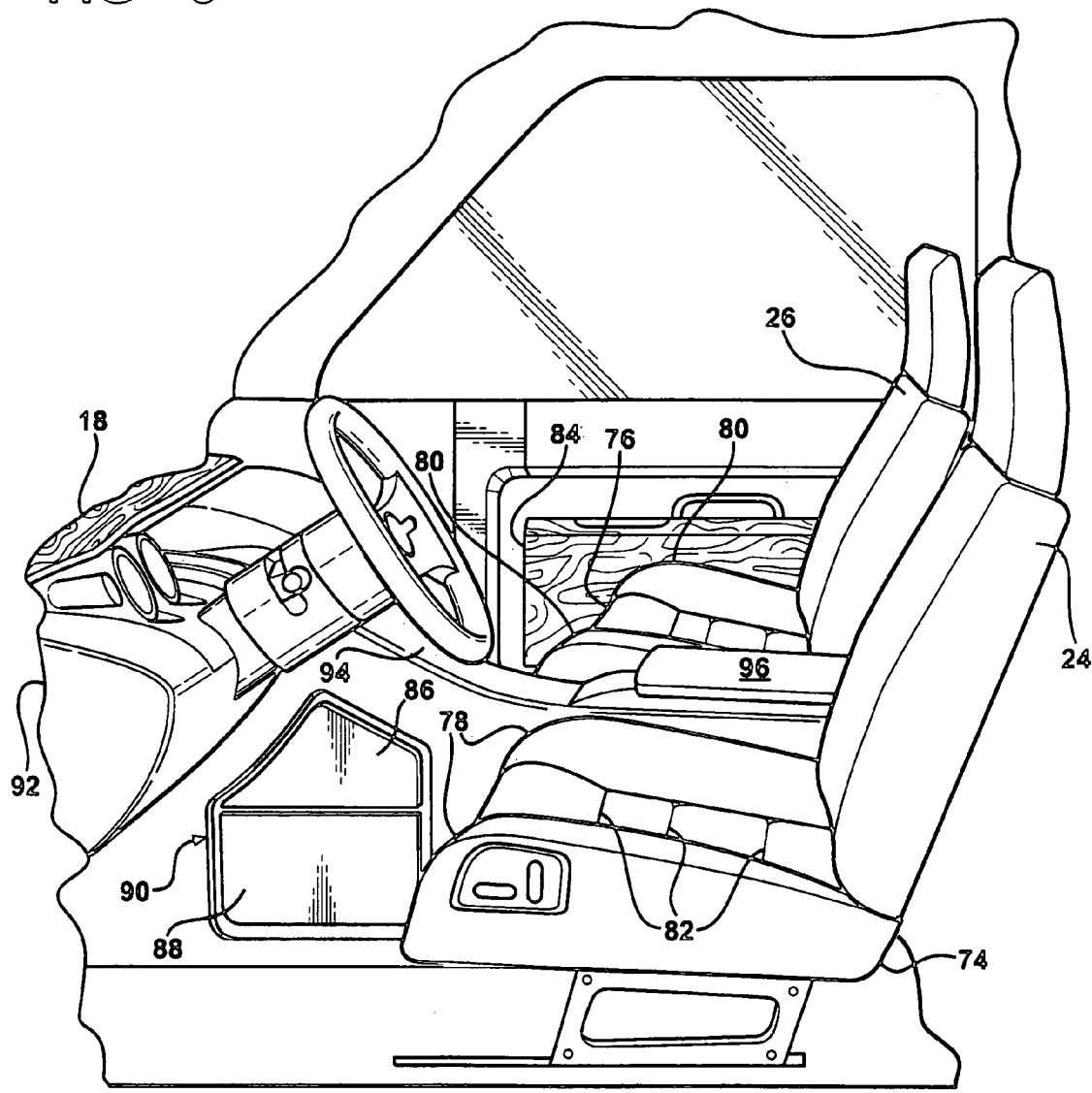
FIG. 6 is a side perspective view of a first zone of the 2005 Ford Fairlane according to one embodiment of the present invention.

First zone 12 has a overall design focus for providing a cockpit of luxury and comfort for the driver and front row passenger. Several design features can be utilized as part of first zone 12 to achieve this design focus. For example, with reference to FIG. 6, seat cushions 74 and 76 can include lateral bolsters 78 and 80, respectively, for providing support and comfort to the cockpit occupants. In certain embodiments, lateral bolsters can also be provided as part of seat backs 24 and 26. As shown in FIG. 6, the surfaces seat cushions 74 and 76 can include a number of parallel design lines 86, adding to the luxurious nature of first zone 82. Seats 28 and 30 can be covered with a smooth, luxurious fabric, such as leather.

As another example of a first zone design feature, a laminated wood surface can be used on one or more interior vehicle components. The laminated wood surface gives first zone 12 a look and feel of luxury. Beneficially, the use of laminated wood can reduce the inherent defects of natural lumber, such as warping, bowing or shrinkage.

As shown in FIG. 6, the surface of dashboard 18 and interior surface portion 84 of right front door is constructed of a laminated wood material. It should be understood that the left front door may also include an interior surface portion having a laminated wood surface. Exterior surfaces 86 and 88 of compartment 90 can also be constructed of the laminated wood material.

One example of a wood suitable for use with laminating is bentwood, although other woods can be utilized based on the wood's capability to undergo the laminating process, which typically includes dividing logs into planks for drying and uniting the planks together to form a laminate. In certain embodiments, the laminate thickness is about 33 millimeters, although a broad range of thicknesses can be used in accordance with the teachings of the present invention.

Instrument panel 92 and center console 94 are also designed for the comfort and luxury of the front row occupants. Instrument panel 92 is streamlined for easy viewing and manipulation by the cockpit occupants, while center console 90 includes at least two easily accessible storage compartments 90 and 96.

Figure 7:
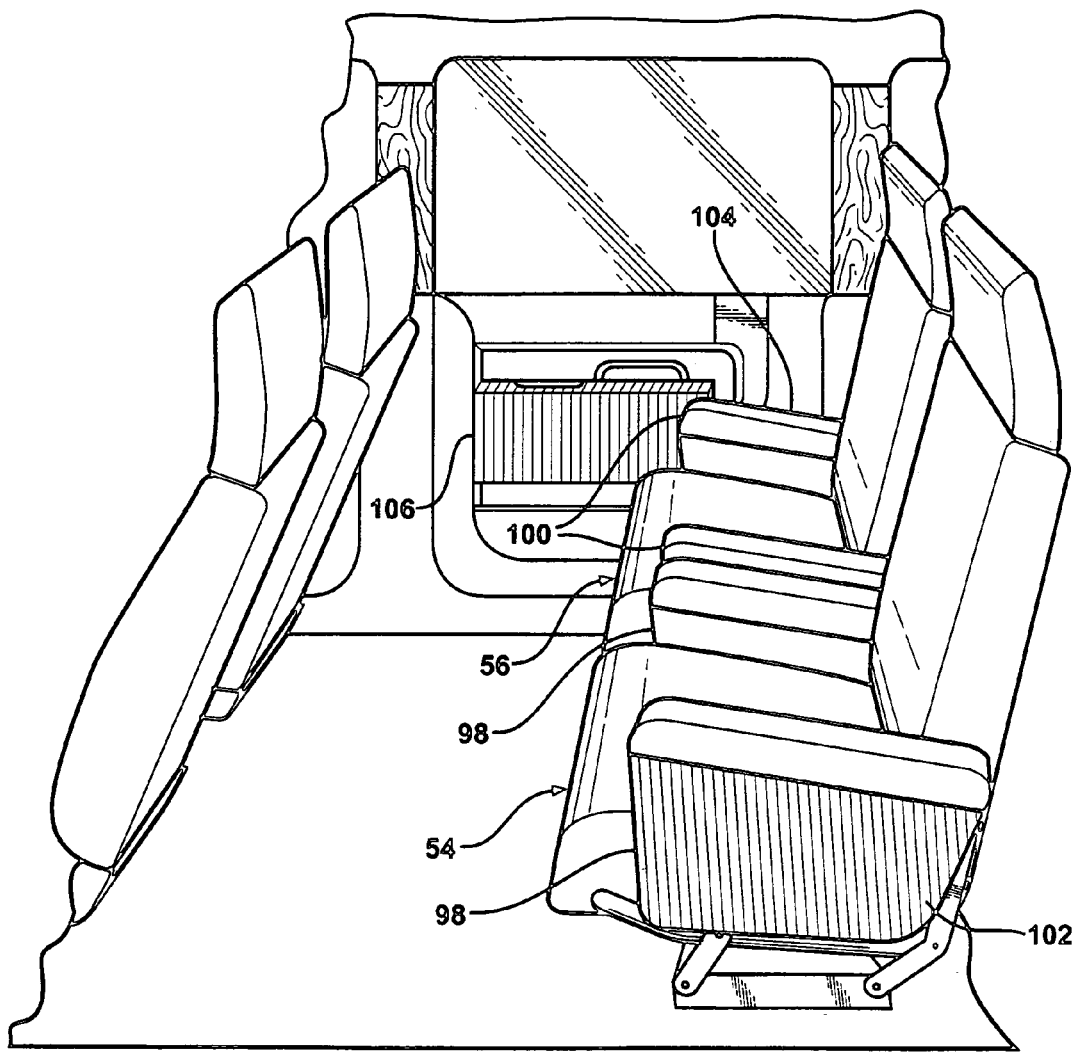
FIG. 7 is a side perspective view of a second zone of the 2005 Ford Fairlane according to one embodiment of the present invention.

Second zone 14 has a overall design focus for providing a passenger compartment of luxury and comfort for the occupants of the first passenger row. As depicted in FIG. 7, an overriding design feature is club seating, similar to first class seating for passengers on an airplane. Whereas the design focus of first zone 12 accounts for the cockpit occupants' comfortable use of the vehicle's instrumentality, the design focus of second zone 14 may focus solely on passive passengers comfort and luxury. Several design features can be utilized as part of second zone 14 to achieve this design focus.

For example, seats 54 and 56, as depicted in FIGS. 7, can have a relatively oversized width for providing comfort to the passenger occupying the seat. Seats 54 and 56 can be covered with a comfortable and luxurious fabric, such as suede or other soft fabric. Moreover, seats 54 and 57 can each include a pair of relatively oversized arm rests 98 and 100 for supporting the occupants lower arm during travel. Outer surfaces 102 and 104 of arm rests 98 and 100, i.e. the surfaces adjacent to the left and right first row passenger doors, can be constructed of a woven material, for example, rattan, or a simulated rattan material. This material evokes a comfortable environment for the passengers while traveling in the vehicle.

Interior surface portion 106 of right door of the first passenger row can also be constructed of a woven material. It should be understood that the left door may also include an interior surface portion having the woven material.

Figure 8:
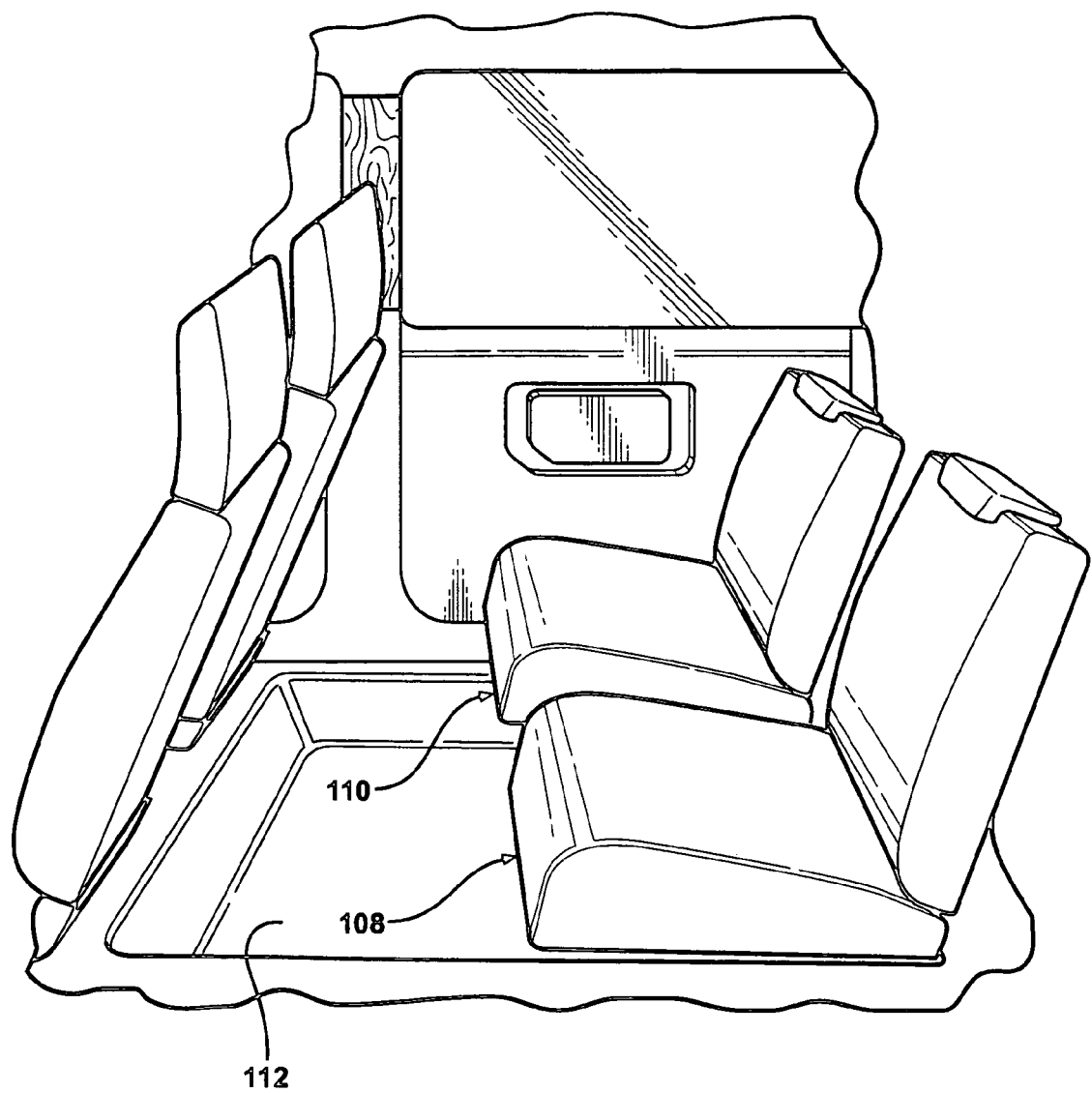
FIG. 8 is a first side perspective view of a third zone of the 2005 Ford Fairlane according to one embodiment of the present invention.

FIGS. 8 and 9 depict third zone 16 of vehicle interior 10. The design focus of third zone 16 is cargo transport and/or leisure activities. It should be understood, however, that third zone 16 can also be utilized as a second row of passenger seating. As part of the cargo transport focus, seats 108 and 110 can fold into bucket 112 such that rear surfaces 114 and 116 of seats 108 and 110 become part of the load floor. Rear surfaces 114 and 116, rear surfaces 46 and 48 of seats 54 and 56, and interior surface portion 118 can be constructed of a metal or metal alloy material. Additionally, interior surface portion 66 located on the right interior surface of the vehicle, and the corresponding surface portion of the left interior surface, can be constructed of the metal or metal alloy material. Using this type of material reinforces the cargo transport focus of third zone 16. The metal or metal alloy material can be stainless steel, although other durable metal or metal materials can be utilized. The metal material can also have shiny or brushed surface depending on the embodiment of the present invention.

As part of the leisure activity focus, tailgate 120 can include recessed cavity 122 for carrying leisure time equipment. For example, recessed cavity 122 can include place settings for a picnic and surface 124 can be used as a picnic table surface. As another example, recessed cavity 122 can be used to stow sporting goods, such as frisbees or individual golf clubs.

According to other embodiments of the present invention, the vehicle interior includes two or more distinct design zones. Using the embodiment disclosed above, second and third design zones 14 and 16 can be combined to create one unique and distinctive design zone for vehicle passengers, i.e. a vehicle passenger zone. Alternatively, second and third design zones 14 and 16 can have design focus of a cargo area that can be formed by folding seats 54, 56, 108, and 110 such that rear surface 48, 50, 114, and 116 create a portion of the load floor. In such case, rear surface 48, 50, 114, and 116 can be constructed of a metal or metal alloy material, thus reinforcing the cargo area design focus. First design zone 12 can be a unique and distinctive zone for vehicle cockpit occupants, i.e. a vehicle cockpit zone.

It should be understood that certain design features may be common to two or more design zones without overwhelming the distinctive design focus of each zone. For example, laminated wood can be used as the surface material for "B" pillars 38 and 40 and "C" pillars 60 and 62. As another example, stainless steel can be used as the surface material for a portion of center console 94.

While the best mode for carrying out the invention has been described in detail, those familiar with the art to which this invention relates will recognize various alternative designs and embodiments for practicing the invention as defined by the following claims.

What is claimed:

1. A vehicle architecture for use with a vehicle including a driver and front-row passenger area positioned about a front section of the vehicle and a first passenger row area positioned about a mid-section of the vehicle, the vehicle architecture comprising:

a vehicle interior including a first zone and a second zone, the first zone having a first design focus including a first design feature, a first seat characteristic and a first interior surface of either the driver side door or the front passenger side door, the first interior surface containing the first design feature, the second zone having a second design focus including a second design feature, a second seat characteristic, and a second interior surface of either the first passenger row left door or the first passenger right door, the second interior surface containing the second design feature, the first seat characteristic containing a first seat surface of a first seat positioned within the driver and front-row passenger area and the second seat characteristic containing a second seat surface of a second seat positioned within the first passenger row area, the first design focus being different than the second design focus, the first design feature being different than the second design feature, the first seat characteristic being different than the second seat characteristic and the first seat surface being different than the second seat surface; wherein the vehicle further including a second passenger row area positioned about a rear section of the vehicle, wherein the vehicle interior includes a third zone having a third design focus including a third design feature, a third seat characteristic and including a third interior surface of either the second passenger row left side panel or the second passenger row right side panel, the third interior surface containing the third design feature, the third seat characteristic containing a third seat surface of a third seat positioned within the second passenger row area, each of the first, second, and third design focuses being different, each of the first, second, and third design features being different, each of the first, second and third seat characteristics being different and each of the first, second and third seat surfaces being different.

2. The vehicle architecture of claim 1, wherein the vehicle is a minivan.

3. The vehicle architecture of claim 1, wherein the first design feature is laminated wood.

4. The vehicle architecture of claim 1, wherein the first zone includes a dashboard containing the first design feature.

5. The vehicle architecture of claim 1, wherein the second zone includes a first passenger row seat, at least one outer surface of the first passenger row seat including the second design feature.

6. A method of designing a vehicle architecture for use with a vehicle including a driver and front-row passenger area positioned about a front section of the vehicle, a first passenger row area positioned about a mid-section of the vehicle, and a second passenger row area positioned about a rear section of the vehicle, the method comprising:

designing a vehicle interior having a first, second, and third zone, the first zone including a first interior surface of either the driver side door or the front passenger side door and a first seat characteristic including a first seat surface of a first seat positioned within the driver and front-row passenger area, the second zone including a second interior surface of either the first passenger row left door or the first passenger right door and a second seat characteristic including a second seat surface of a second seat positioned within the first passenger row area, and the third zone including a third interior surface of either the second passenger row left side panel or the second passenger row right side panel and a third seat characteristic including a third seat surface of a third seat positioned within the second passenger row area; and focusing one or more distinctive design features onto each of the first seat characteristic, the first seat surface and the first interior surface of the first zone; the second seat characteristic, the second seat surface and the second interior surface of the second zone; and the third seat characteristic, the third seat surface and the third design surface of the third zone, wherein the one or more distinctive design features of the first, second, and third interior surfaces are different from each other and wherein the one or more distinctive design features of the first, second, and third seat surfaces are different from each other.

7. The method of claim 6 wherein a distinctive design feature of the first zone is a laminated wood material.

8. The method of claim 6 wherein a distinctive design feature of the second zone is a rattan material.

9. The method of claim 6 wherein a distinctive design feature of the third zone is a metal or metal alloy material.

10. The method of claim 9 wherein the metal or metal alloy material is stainless steel.

11. An interior vehicle architecture for use with a vehicle including a driver and front-row passenger area positioned about a front section of the vehicle, a first passenger row area positioned about a mid-section of the vehicle, and a second passenger row area positioned about a rear section of the vehicle, the architecture comprising:

a first zone having a first design focus including a first design feature, a first interior surface of either the driver side door or the front passenger side door and a first seat characteristic, the first interior surface containing the first design feature and the first seat characteristic containing a first seat surface of a first seat positioned within the driver and front-row passenger area;

a second zone having a second design focus including a second design feature, a second interior surface of either the first passenger row left door and the first passenger right door and a second seat characteristic, the second interior surface containing the second design feature and the second seat characteristic containing a second seat surface of a second seat positioned within the first passenger row area; and a third zone having a third design focus including a third design feature, a third interior surface of either the second passenger row left side panel or the second passenger row right side panel and a third seat characteristic, the third interior surface containing the third design feature and the third seat characteristic containing a third seat surface of a third seat positioned within the second passenger row area, each of the first, second, and third design focuses being distinctive; each of the first, second and third design features being distinctive; each of the first, second, and third seat characteristics being distinctive; each of the first, second, and third interior surfaces being distinctive and each of the first, second, and third seat surfaces being distinctive.

12. The interior vehicle architecture of claim 11, wherein the first design feature is laminated wood material, the second design feature is a rattan material, and the third design feature is metal or metal alloy material.

13. The interior vehicle architecture of claim 11, wherein the interior is a minivan interior.

14. The vehicle architecture of claim 1, wherein the first seat characteristic includes seat cushions and seat backs each having lateral bolsters, the second seat characteristic includes extended arm rests, and the third seat characteristic being independent of lateral bolsters or extended arm rests.

15. The vehicle architecture of claim 1, wherein the first seat surface includes first and second sides and is leather on both the first and second sides, the second seat surface includes first and second sides and the first side of the second seat surface is suede and the second side of the second seat surface is metal or metal alloy, and the third seat surface is metal or metal alloy on one side.

16. The interior vehicle architecture of claim 11, wherein the first seat characteristic includes seat cushions and seat backs each having lateral bolsters, the second seat characteristic includes extended arm rests, and the third seat characteristic being independent of lateral bolsters or extended arm rests.

* * * * *